United States Patent
Anderson

(10) Patent No.: US 9,826,803 B2
(45) Date of Patent: Nov. 28, 2017

(54) YOUR VIEW

(71) Applicant: Dawan Anderson, Frankfort, IL (US)

(72) Inventor: Dawan Anderson, Frankfort, IL (US)

( * ) Notice: Subject to any disclaimer, the term of this patent is extended or adjusted under 35 U.S.C. 154(b) by 0 days.

(21) Appl. No.: 15/584,201

(22) Filed: May 2, 2017

(65) Prior Publication Data
US 2017/0231337 A1    Aug. 17, 2017

Related U.S. Application Data

(63) Continuation-in-part of application No. 14/996,519, filed on Jan. 15, 2016, now abandoned.

(51) Int. Cl.
| | |
|---|---|
| G03B 21/14 | (2006.01) |
| A44C 15/00 | (2006.01) |
| G06F 1/16 | (2006.01) |
| G03B 21/54 | (2006.01) |
| G03H 1/00 | (2006.01) |

(52) U.S. Cl.
CPC ........ *A44C 15/0015* (2013.01); *A44C 15/005* (2013.01); *G03B 21/14* (2013.01); *G03B 21/54* (2013.01); *G03H 1/0005* (2013.01); *G06F 1/163* (2013.01); *G06F 1/1656* (2013.01); *G03H 2001/0055* (2013.01); *G03H 2227/02* (2013.01); *G03H 2227/06* (2013.01); *G06F 1/1684* (2013.01)

(58) Field of Classification Search
CPC .. G03B 21/14; G03B 21/005; G02B 27/0172; G02B 27/0174
See application file for complete search history.

(56) References Cited

U.S. PATENT DOCUMENTS

| | | | |
|---|---|---|---|
| 7,133,002 B2* | 11/2006 | Langlois | G09F 21/02 345/8 |
| 2005/0251395 A1* | 11/2005 | Lich | G02B 27/01 704/275 |
| 2007/0229650 A1* | 10/2007 | McKay | G06F 3/016 348/14.01 |
| 2009/0295712 A1* | 12/2009 | Ritzau | G06F 1/1626 345/156 |
| 2011/0007035 A1* | 1/2011 | Shai | G06F 3/014 345/179 |
| 2015/0277841 A1* | 10/2015 | Lanier | G06F 3/014 345/428 |
| 2016/0033792 A1* | 2/2016 | Blum | G02C 11/10 348/294 |
| 2016/0178906 A1* | 6/2016 | Rider | G02B 27/0172 726/17 |
| 2016/0260261 A1* | 9/2016 | Hsu | G06T 19/006 |

* cited by examiner

*Primary Examiner* — William C Dowling
(74) *Attorney, Agent, or Firm* — RG Patent Consulting, LLC; Rachel Gilboy

(57) ABSTRACT

The present invention discloses an article of jewelry, preferably a necklace with a hologram. The disclosed apparatus is provided with a hologram to display various things within the necklace and make it appear more stylish and enhancing the decorative appeal. The disclosed apparatus is capable of interacting with the multimedia devices like phone and can connect with them to display images and other things present in them via hologram in the necklace.

13 Claims, 5 Drawing Sheets

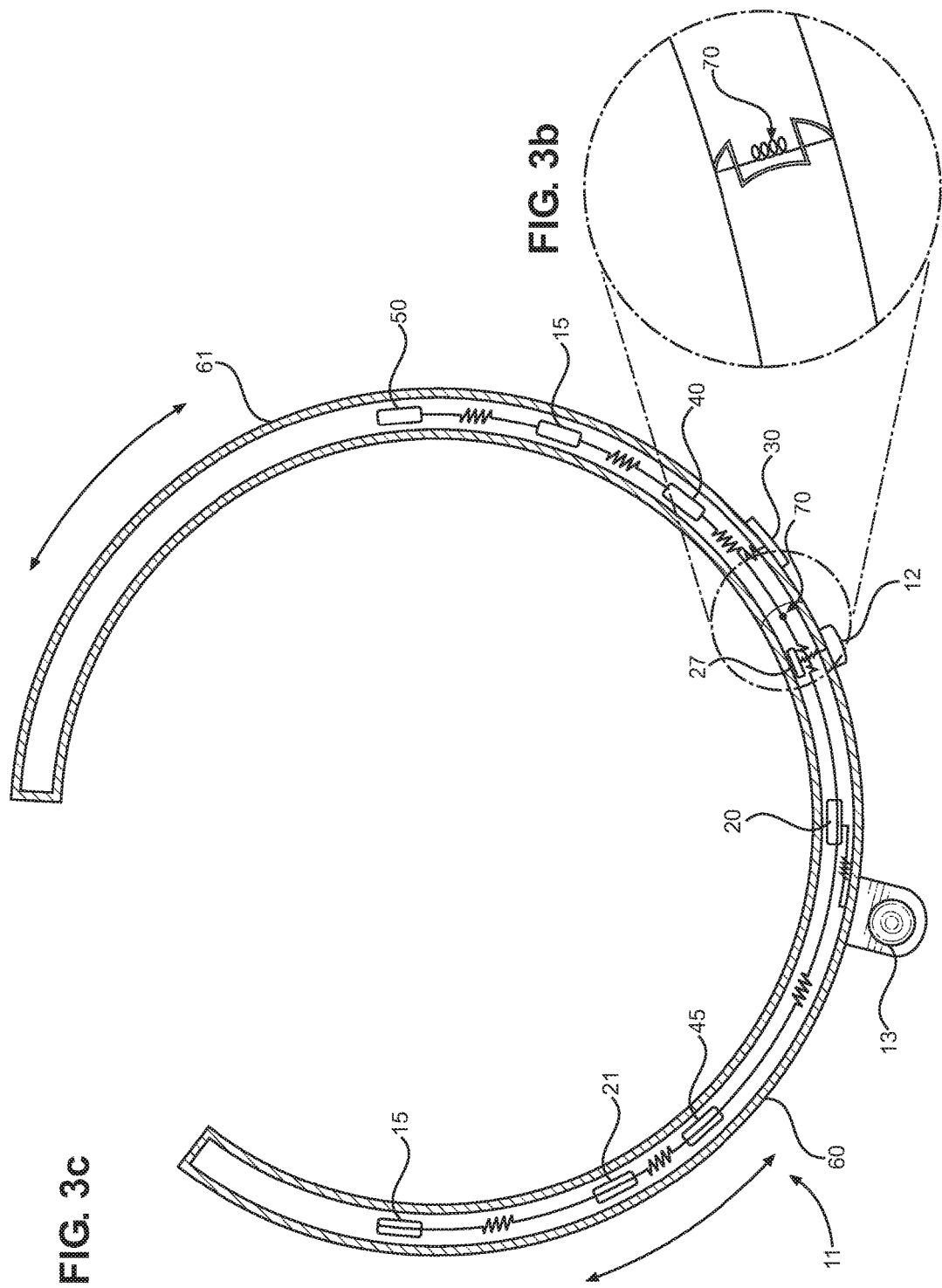

YOUR VIEW

CROSS-REFERENCE TO RELATED APPLICATION

The present application is related to and claims priority from prior provisional application Ser. No. 14/996,519, filed Jan. 15, 2016 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to jewelry and more particularly to an article of jewelry provided with hologram having a system for custom-changing the appearance of the hologram element of a jewelry piece.

2. Description of the Related Art

Various jewelry items such as watches, brooches, pins, pendants, necklaces, rings and bracelets are worn for decorative or aesthetic purposes. Typically, such items include an ornamental gemstone. Gemstone motion generally results in variable light refraction and reflection thereby enhancing the aesthetic effect of the jewelry item.

Typically, one person's wardrobe, especially that of a woman, includes a variety of clothing articles of different styles and colors to be worn as appropriate for the season, time of day, event attached, and so on. Wearing a particular clothing article, such as a dress having a certain color, typically requires matching jewelry pieces. Thus, many jewelry pieces are needed if a matching style is always desired.

Purchasing various pieces of jewelry having precious stone elements to match for example the various colors in one's wardrobe can be very expensive, even if such stone element is artificial. This is because, currently, the jewelries available on the market are rigid in design and cannot adapt to the customer's various needs. Namely, the available jewelries do not give the flexibility to the customer to custom-change the look of their jewelries to match the outfit, its color, or the style of their preference.

Various prior arts have disclosed different type of such ornamental jewelry. U.S. Pat. No. 8,462,079 B2 discloses an ornamental system, apparatus and method is dynamically modifiable. The ornament system comprises a processor, at least one ornamental member and a data controller. The processor is a computer or similar device that stores data for transmission. US 20130074543 A1 discloses a jewelry piece in which the precious stone is replaced with an apparatus comprising a screen, wherein the apparatus is capable of receiving from a smartphone and displaying on the screen an image a user selects from plurality of choices.

U.S. Pat. No. 5,703,703 A discloses a holographic ornament comprising a hologram which has an operative surface, provided the operative surface is masked by a masking member, wherein the masking member is formed with at least one letter shaped cut through which a part of the operative surface of the hologram is exposed. U.S. Pat. No. 8,270,079 B1 discloses a first article with a surface bearing a diffraction grating that comprises a plurality of elevated regions and recessed regions and a reflective coating that provides reflective diffraction within the article but is sufficiently thick to prevent diffraction outside the article. Another prior art, U.S. Pat. No. 7,547,111 B2 discloses a decoration apparatus that have an attractive appearance and multi-functional capabilities. The decoration apparatus includes one or more internal light sources that provide lighting effects in combination with decorative elements formed in the structure.

Accordingly, the present invention overcomes the disadvantages associated with the prior art, by providing a jewelry item having a designated space for incorporating hologram in the jewelry article and other advantageous feature of making the same communicably active with multimedia devices.

BRIEF SUMMARY OF THE INVENTION

In view of the foregoing disadvantages inherent in the known types of ornamental jewelry or like in the prior art, the present invention provides an improved article of jewelry preferably a necklace with a hologram to present various types of holograms in the front and make it more decoratively appealable. As such, the general purpose of the present invention, which will be described subsequently in greater detail, is to provide a new and improved hologram containing necklace with all the advantages of the prior art and none of the disadvantages.

It is an object of the present invention to provide an improved article of jewelry preferably a necklace with a hologram that can advertise various items or can show Facebook status or emoticon or like.

A further object of the present invention is to provide an improved hologram consisting necklace provided with a mini hologram projector that can connect with Bluetooth of a cell phone or computer.

A further object of the present invention is to provide an improved article of jewelry that has ability to project different things present in user's phone or computer in a stylish and decorative manner An additional object of the present invention to provide an improved article of jewelry, a hologram consisting necklace that is easy to manufacture and makes the necklace look more stylish, appealing and decorative.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting

BRIEF DESCRIPTION OF THE DRAWINGS

The figures which accompany the written portion of this specification illustrate embodiments according to the teachings of the present invention.

FIG. 3B shows a cross-sectional view of the hologram necklace according to a second embodiment of the present invention.

FIG. 3C shows a close-up view of the pivotal and biased connection between the two tubular portions of the hologram necklace according to a second embodiment of the present invention.

Figure 1:
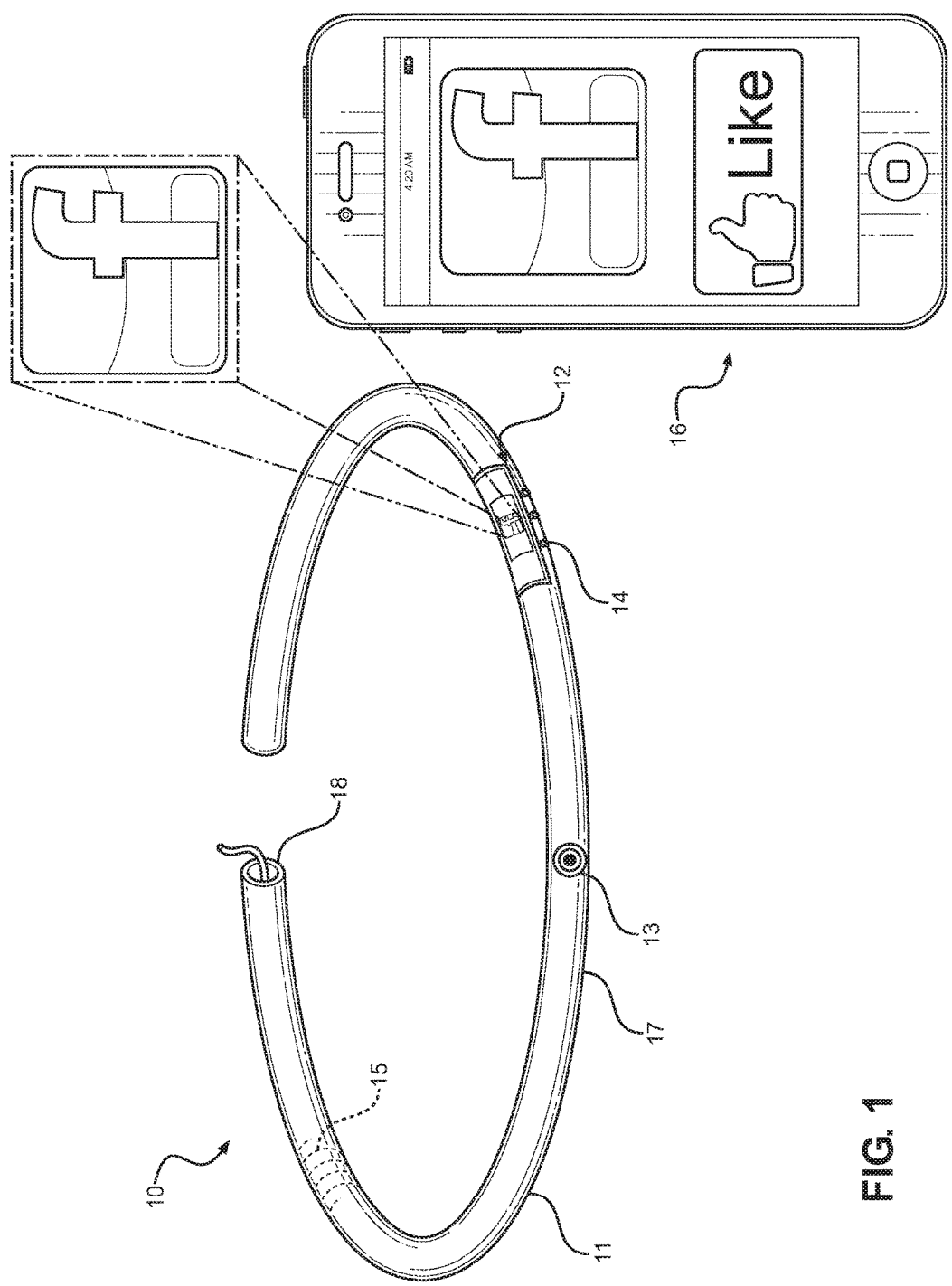
FIG. 1 shows a perspective view the hologram necklace according to the preferred embodiment of the present invention.
Figure 2A:
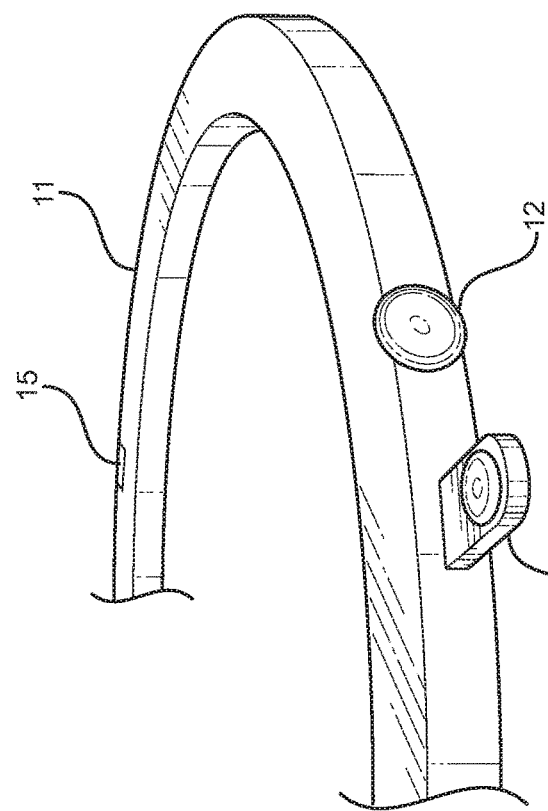
FIG. 2A shows a close-up perspective view of the movable camera in a closed position according to the preferred embodiment of the present invention.
Figure 2B:
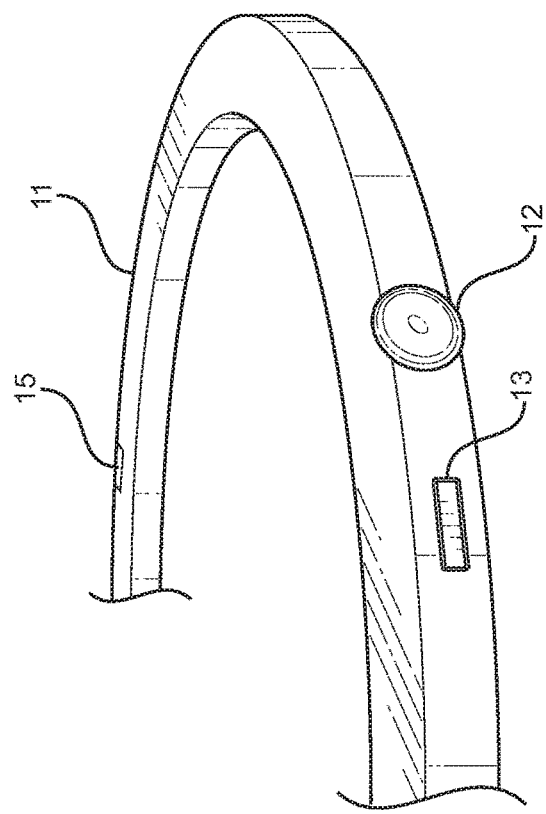
FIG. 2B shows a close-up perspective view of the movable camera in an open position according to the preferred embodiment of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Turning now descriptively to drawing, referring to FIGS. 1-4, the present invention discloses an article of jewelry 10 to be worn by the user in daily routine life or for special occasions to enhance the overall look. The disclosed jewelry article 10 is preferably a hologram necklace 11 to be worn around the user's neck having a main body 17 formed as an elongated tube 18 having a curved shape adapted to be removably placed upon and around the neck of a user. The hologram necklace 11 includes designated spaces for a hologram projector 12, wherein said hologram projector 12 is attached to said main body such that when the main body is placed upon and around the neck of the user the hologram projector is adapted to project hologram images in front of the eyes of the user to be viewed by the user; a camera 13 attached to the main body and adapted to take pictures and videos and store images of these pictures and videos within computer circuitry 21, is electronically connected to a power source 20, and wherein the computer circuitry 21 is located within the elongated tube of said the body and includes computer coding thereon adapted to control all the electronic features of the hologram necklace; a sensor member 14 attached to the main body, is electronically connected to the power source and the computer circuitry, and is adapted to sense electronic communication devices in proximity to the hologram necklace and send information to the computer circuitry; speaker members 15 positioned on the main body such that they are adapted to be located adjacent respective ears of the user; wherein the computer circuitry is adapted to connect with smart phones 16 and other like media devices; and a control panel 30 which functions to allow the user to control the computer circuitry 21 and thereby all the electronic features of the hologram necklace.

The preferred embodiment of the present invention is designed to help users present themselves more stylishly by wearing decorative and meaningful jewelry articles, while the hologram projector 12 projects desired signs, holograms, advertisements, pictures etc. or the like from the hologram necklace 11. The hologram necklace 11 is further adapted to allow a user to pick up displayed images or like from a smart phone 16 to then be displayed by its hologram projector 12.

As disclosed above, the hologram necklace 11 is adapted to communicate with media devices, and therefore can be linked with camera 13 to be used for face to face interaction with other user's connected on a social networking site, thus avoiding the need of carrying a mobile phone or the like to connect with people. Additionally, speakers 15 are provided to enable the user to communicate orally with a user connected therewith. The hologram necklace 11 is provided with an additional function of BLUETOOTH technology with recognition and pairing to be used in conjunction therewith and help in utilizing the above mentioned features with a wireless connection. The sensor 14 also adds an extra convenience in pairing or connecting the hologram necklace 11 with multimedia devices.

Further features of the instant invention include the power source 20 being formed as a rechargeable battery member; a receiver member 40 located within the tube of the main body, is electronically connected to the power source and the computer circuitry, and is adapted to receive electronic signals; a transmitter member 45 located within the tube of the main body, is electronically connected to the power source and the computer circuitry, and is adapted to send electronic signals; wherein the receiver member, the transmitter member, and the computer circuitry including BLUETOOTH technology; at least one microphone member 27 attached to the main body, is electronically connected to the power source and the computer circuitry, and is adapted to receive audio sounds and transfer audio files to the computer circuitry; wherein the electronic signals includes audio signals, picture images, and video images, such that a user can communicate with the another individual via audio signals and visual images; a GPS member 50 located within said tube of said main body, is electronically connected to said power source and said computer circuitry, and is adapted to interact with satellite members of a GPS system to provide positioning information of said hologram necklace, and to provide directions to a user wearing said hologram necklace; and wherein the camera member is slidably attached to the main body, such that it can reside within said tube of said main body when not in use and slide outwardly therefrom to an in-use position. Furthermore, the main body is formed from a flexible material, such that it is adapted to be flexed, placed around the neck of the user, and return to its original shape to thereby be held upon the neck of the user.

Figure 3A:
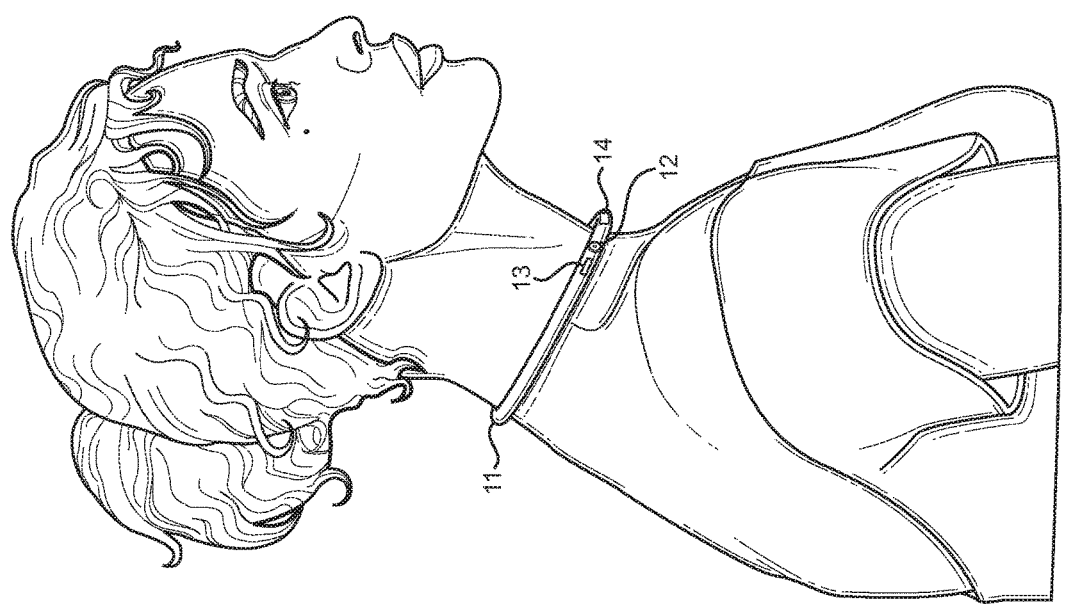
FIG. 3A shows a perspective view of the hologram necklace according to the preferred embodiment of the present invention being worn by a user.
Figure 4:
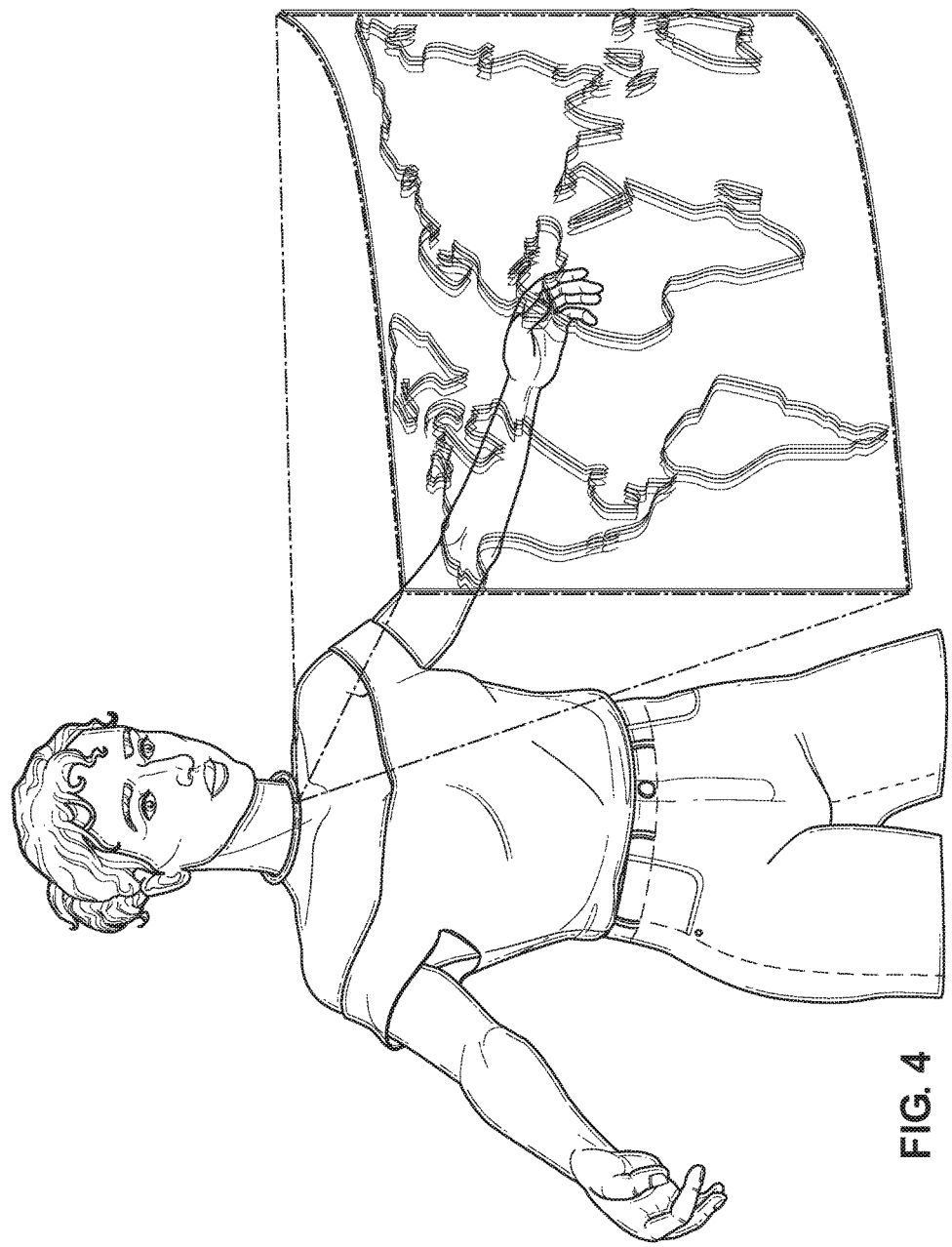
FIG. 4 shows a perspective view of the hologram necklace being worn by a user and in an in-use condition of the preferred embodiment of the present invention.

In a second embodiment, shown in FIGS. 3a-3c, the elongated tubular member of said main body is formed from two tubular portions 60 and 61 that are pivotally connected together at adjacent ends thereof, such that the two tubular portions are adapted to be pivoted in a first direction, placed around the neck of the user, and pivoted in a second direction opposite said first direction to thereby be held upon the neck of the user. In a preferred embodiment of this second embodiment, the two tubular portions 60 and 61 are pivotally biased toward one another via a spring member 70.

In an aspect of the present invention, the present article of jewelry preferably necklace contains the hologram, provided the hologram can be rotated to show on different surfaces; and also the necklace can be used as phone or communication device without the assistance of smartphone.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

I claim:

1. A hologram necklace adapted to be placed upon and around the neck of a user, said hologram necklace comprising:
   a main body;
      wherein said main body is formed as an elongated tube having a curved shape adapted to be removably placed upon and around the neck of a user;
   a hologram projector;
      wherein said hologram projector is attached to said main body such that when said main body is placed upon and around the neck of said user said hologram projector is adapted to project hologram images in front of the eyes of said user to be viewed by said user;
   computer circuitry;
      wherein said computer circuitry is located within said elongated tube of said main body and includes computer coding thereon adapted to control said hologram images;
   a power source;
      wherein said power source is located within said elongated tube of said main body and is adapted to provide power to said computer circuitry and said hologram projector;
   a control panel;
      wherein said control panel is attached to an outer surface of said main body and is electronically connected to said power source, said computer circuitry, and said hologram projector;
      wherein said control panel is adapted to control power from said power source to said computer circuitry and said hologram projector; and
      wherein said control panel and said computer circuitry function to control said hologram images projected by said hologram projector;
   a receiver member;
      wherein said receiver member is located within said tube of said main body, is electronically connected to said power source and said computer circuitry, and is adapted to receive electronic signals;
   a transmitter member;
      wherein said transmitter member is located within said tube of said main body, is electronically connected to said power source and said computer circuitry, and is adapted to send electronic signals;
   at least one microphone member;
      wherein said at least one microphone member is attached to said main body, is electronically connected to said power source and said computer circuitry, and is adapted to receive audio sounds and transfer audio files to said computer circuitry;
   at least one speaker member;
      wherein said at least one speaker member is attached to said main body, is electronically connected to said power source and said computer circuitry, and is adapted to project audio sounds therefrom; and
   a camera member;
      wherein said camera member is attached to said main body, is electronically connected to said power source and said computer circuitry, and is adapted to take pictures and videos and store images of said pictures and videos within said computer circuitry.

2. The hologram necklace of claim 1, wherein said power source is formed as a rechargeable battery member.

3. The hologram necklace of claim 1, further comprising a sensor member attached to said main body, is electronically connected to said power source and said computer circuitry, and is adapted to sense electronic communication devices in proximity to said hologram necklace.

4. The hologram necklace of claim 1, wherein said receiver member, said transmitter member, and said computer circuitry are adapted to use BLUETOOTH technology.

5. The hologram necklace of claim 1, wherein said hologram necklace is adapted to electronically connect with and communicate with a smart phone member via said receiver member, said transmitter member, and said computer circuitry, and is adapted to allow a user to send and receive electronic signals to and from said hologram necklace to and from a smart phone of another individual.

6. The hologram necklace of claim 1, wherein said electronic signals are chosen from a group of electronic signals consisting of audio signals, picture images, and video images, such that a user can communicate with said another individual via audio signals and visual images.

7. The hologram necklace of claim 1, further comprising a GPS member located within said tube of said main body, is electronically connected to said power source and said computer circuitry, and is adapted to interact with satellite members of a GPS system to provide positioning information of said hologram necklace, and to provide directions to a user wearing said hologram necklace.

8. The hologram necklace of claim 1, wherein there are two spaced speaker members attached to said to said main body, and wherein they are positioned on said main body such that they are adapted to be located adjacent respective ears of said user.

9. The hologram necklace of claim 1, wherein there is one microphone member attached to said main body, and located such that it is adapted to be placed adjacent to the mouth of said user.

10. The hologram necklace of claim 1, wherein said camera member is slidably attached to said main body, such that said camera member can reside within said tube of said main body when not in use and slide outwardly therefrom to an in-use position.

11. The hologram necklace of claim 1, wherein said main body is formed from a flexible material, such that it is adapted to be flexed, placed around the neck of said user, and return to its original shape to thereby be held upon the neck of said user.

12. The hologram necklace of claim 1, wherein said elongated tubular member of said main body is formed from two tubular portions pivotally connected together at adjacent ends thereof, such that said two tubular portions are adapted to be pivoted in a first direction, placed around the neck of said user, and pivoted in a second direction opposite said first direction to thereby be held upon the neck of said user.

13. The hologram necklace of claim 12, wherein said two tubular portions are pivotally biased toward one another via a spring member.

\* \* \* \* \*